United States Patent [19]
Marcy

[11] 3,715,599
[45] Feb. 6, 1973

[54] ELECTRO-OPTICAL SYSTEM FOR CONTROLLING THE ATTITUDE OF A STAGE MOUNTED ON A CARRIAGE SLIDING ALONG A PARALLEL BENCH

[75] Inventor: Raymond Marcy, Paris, France

[73] Assignee: Thomson-CSF

[22] Filed: April 20, 1971

[21] Appl. No.: 135,659

[30] Foreign Application Priority Data

April 21, 1970 France..................................7014414

[52] U.S. Cl.......250/231 R, 356/106 R, 250/219 DR
[51] Int. Cl..................................................G01d 5/34
[58] Field of Search....250/219 DR, 234, 202, 231 R; 356/106 R, 152 153

[56] References Cited

UNITED STATES PATENTS 3,434,787  3/1969  Chitayat..........................356/106 R
3,588,254  6/1971  Rhoades..........................356/106 R
3,573,849  4/1971  Herriot...........................356/106 X
3,213,282  10/1965 Brouwer..........................250/202
3,114,842  12/1963 Davidson........................250/234 X
2,853,917  9/1958  Koulikovitch....................356/106 R
3,622,244  11/1971 Chitayat.........................356/106 R
3,574,292  4/1971  Butts.............................356/106 X Primary Examiner—Walter Stolwein
Attorney—Cushman, Darby & Cushman

[57] ABSTRACT

Electro-optical system for controlling the attitude of a stage mounted on a carriage sliding along a parallel bench.

The system in accordance with the invention corrects "yaw" defects on the part of the moving element sliding along the bench. To this end a beam of radiant energy supplies the directional reference and electromechanical transducers are used for controlling the attitude of the stage with respect to this optical reference.

8 Claims, 4 Drawing Figures

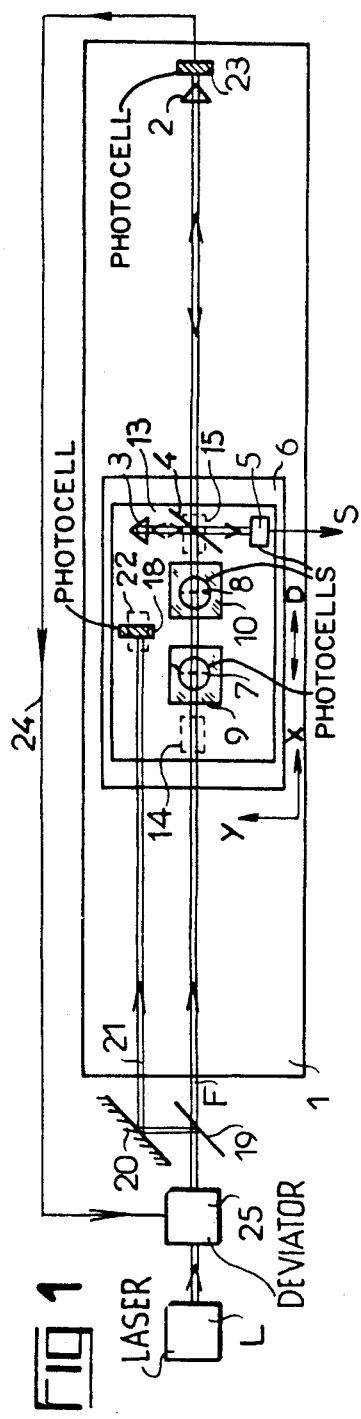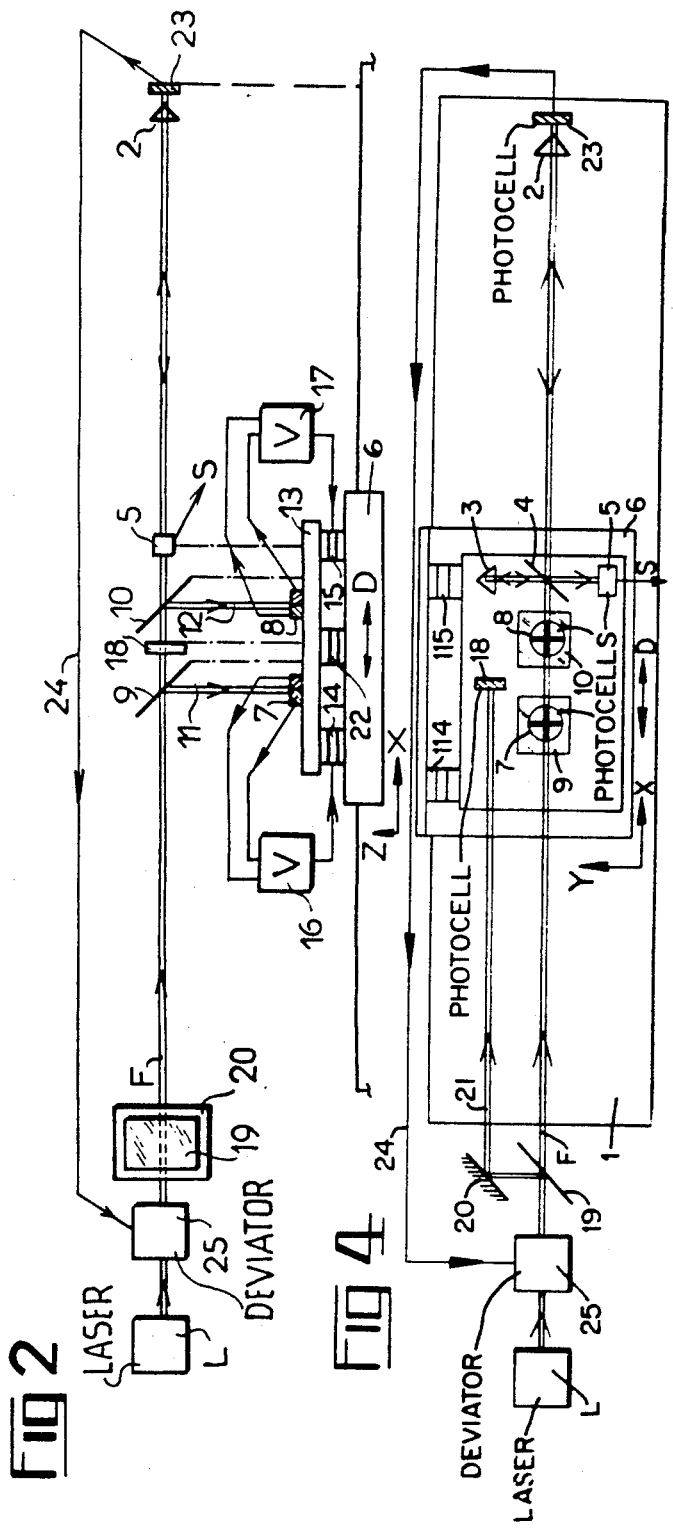

ELECTRO-OPTICAL SYSTEM FOR CONTROLLING THE ATTITUDE OF A STAGE MOUNTED ON A CARRIAGE SLIDING ALONG A PARALLEL BENCH

The present invention relates to improvements in metrology systems of the kind employed to accurately effect and measure translatory displacements of moving elements on frames. The invention relates equally to systems of this kind which are used exclusively for metrology purposes, and to systems which are used for high-precision positioning of components on machines (high-precision machine tools, machines used for the manufacture of integrated circuit masks . . . ), through the medium of translatory motions in one or more directions, and of accurate measurements of these translatory motions.

Numerous metrology systems and/or positioning systems are already in existence, in which a moving carriage is displaced upon a frame which constitutes either the measuring bench or the machine frame, the accurate measurement of displacements in each translatory direction being effected in a manner known per se, by interferometer techniques which advantageously employ a coherent light source such as a laser. Improvements of all kinds have already been made to systems of this type, that is to say both to the optical parts thereof, namely the measuring part proper, and to the mechanical parts, which are responsible for the displacement. Despite this, these systems often exhibit a major defect, namely that of "yaw" in the moving carriage, this giving rise to errors as a consequence of parasitic displacements of the carriage in any direction other than the relevant direction of translation. Devices for correcting these defects have already been produced ; they are generally complex in nature, do not work efficiently and substantially increase the weight of the measuring bench of the machine to which they are fitted, this the more so the greater the length of the translatory motions involved.

The object of the present invention is to improve pure metrology systems or high-precision positioning systems which include metrology, i.e. systems such as those already described hereinbefore, by providing them with particularly easily manufactured dynamic yaw-correcting devices, thus enabling the quality of the translatory motions and the precision of measurement, to be substantially improved.

According to the present invention there is provided electro optical system for controlling the attitude of a stage mounted on a carriage sliding along a parallel bench having a translation axis, comprising : means for emitting at least one beam of radiant energy parallel to said axis, means integral with said stage for detecting said energy and means for displacing said stage with respect to said carriage;said energy detection means including two semi-reflecting faces providing along two optical paths perpendicular to said beam and located within a plane containing said axis, first and second reflected portions of the energy of said beam ; said energy detection means further including at the ends of said paths first and second photoelectric detectors delivering error signals upon reception of said reflected energy portions ; said displacing means including at least two electro-mechanical transducers capable of displacing said stage in a direction parallel to said plane and means for feeding back said error signal to said electro-mechanical transducers.

Improved systems of this kind make it possible to effect length measurements to an accuracy which is superior to that of existing systems, by preventing the falsification of a length measurement, effected in conventional manner by the counting of the interference fringes which pass during the displacement of the carriage from one end to the other of the component being measured for example, by virtue of improper positioning of the measuring carriage.

These systems can be used not only for metrology arrangements designed to measure the dimensions of components, and for example to create "transfer standards," but could also be fitted to machines whose elements require high accuracy positional control, as for example machines used in the manufacture of subminiaturized circuits ; in this latter case, the component to be positioned is placed upon the moving carriage and its position is marked by the associated metrology laser.

Other objects and features of the invention will be apparent from the following description given here by way of a non-limitative example and illustrated by the attached figures in which :

FIG. 1 is a plan view illustrating in a highly schematic manner, the essential elements of a metrology system utilizing translatory motions in one direction, of an improved mobile carriage in accordance with the invention ;

FIG. 2 is a frontal view corresponding to the plan view of FIG. 1 ;

FIG. 4 is a plan view showing further elements of the metrology system illustrated in FIG. 1.

Figure 3:
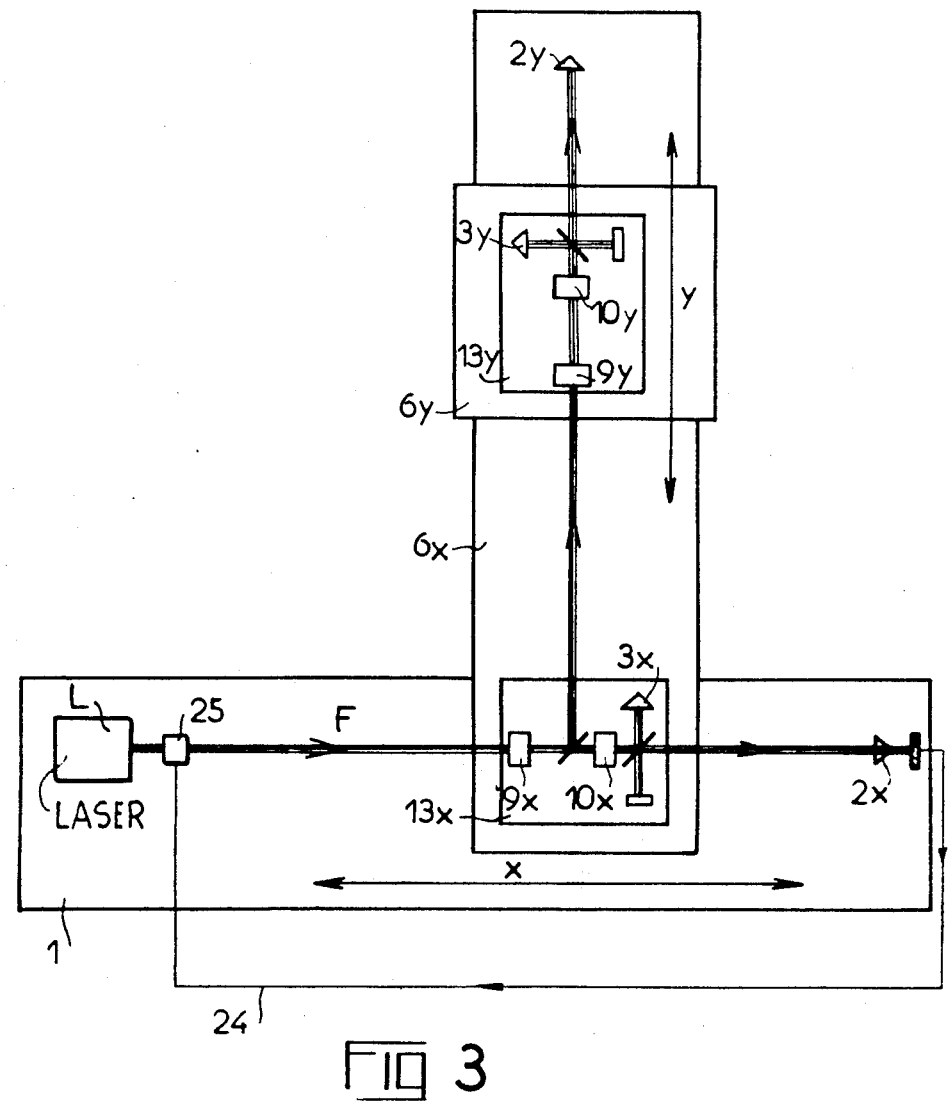
FIG. 3 is a plan view which represents highly schematically the general arrangement of an assembly such as that shown in FIGS. 1 and 2, with translatory motions, this time in two mutually perpendicular directions.

FIGS. 1 and 2 schematically illustrate the elements of a metrology system, which are required for an understanding of the invention. The overall system will be sufficiently well known to those skilled in the art not to require any recapitulation here.

The frame 1 of a parallel bench supports in particular the measuring unit which consists for example of a Michelson interferometer with two reflective elements, such as two prisms 2 and 3 and a semireflective plate 4, illuminated by the beam F produced by a laser source L. An optical-electrical detector transforms the interference fringes which are obtained, into electrical signals S. Whereas the prism 2 is attached to the frame 1 and is consequently fixed, the prism 3 as well as the plate 4 and the detector 5, are mechanically attached to a sliding carriage 6 on the frame 1, the motion of the carriage being a translatory one in a direction D parallel to the direction of the beam F. The carriage 6 is displaceable on the frame 1 by any appropriate conventional means, such for example as a system of slides which have not been shown however. The displacements D of this carriage are translated into terms of a movement of interference fringes in front of the detector 5, and of a quasi-sinusoidal variation in the detected signals S. Fringe-counting devices, likewise well known to the person skilled in the art, enable the number of fringes and fringe fraction which correspond to a displacement D, to be measured, and consequently enable a quantized value of the length of said displacement to be produced ; the value of the measurement quantum and consequently the accuracy of the measurement, depends in particular upon the counting devices and upon their degree of accuracy.

A system of this kind, when used for pure metrology applications, will comprise for example two sensing devices one associated with the frame and the other with the carriage, which are designed to accurately mark the ends of a component being measured, the measurement being effected by counting the fringes passing in front of the detector during the displacement in the direction D on the part of the carriage, from a position corresponding to the measurement zero, to a position corresponding to the ends of the component being measured. There are a variety of applications and a variety of methods of using, systems of this kind. Where accurate positioning is to be effected, it is sufficient to arrange the component which is to be positioned, on the mobile carriage. The improvements in accordance with the present invention, which are now to be described, are applicable and effective in all cases.

It will be abundantly clear that any parasitic movement of the carriage 6 in a direction other than that of the translatory direction D, such as movements due to "yawing" of the carriage, will interfere not only with length measurements but also with positioning operations.

In order to compensate for such defects, the invention utilizes a dynamic correction device servo-linked to the measurement laser beam, the direction of which latter can be accepted as being highly stable in terms of space and time.

Photoelectric detectors 7 and 8 of a conventional type are attached to the sliding carriage 6 and, through the medium of partially reflective plates or prisms 9 and 10 attached to the carriage 6 in such a fashion as to intercept the beam 5, receive part (11, 12), of the light of said beam. In one embodiment, each of said cells comprises two adjacent sectors aligned along the direction D ; the broken lines in FIG. 1 schematically indicate the boundary between these two sectors.

For a correct position on the part of the carriage D, the beams 11 and 12 illuminate the two sectors identically and the cells produce zero error signals. On the other hand, parasitic movements of the carriage 6 will result in a variation in the incidence of the beams 11 and 12 on the cells 7 and 8 so that the latter produce non-zero error signals characteristic of said parasitic movements.

In accordance with the invention, the moving carriage is provided in addition to the element 6, with a stage 13 which carries the photoelectric detectors, the partially reflective elements 9 and 10, the moving prism 3, the semireflective plate 4 and the detector 5 of the interferometer. Said stage 13 is attached to the element 6 by stacks of piezoelectric ceramics such as those marked 14 and 15. In the normal position, that is to say in the absence of any parasitic movement of the carriage, said plate is parallel to the element 6 of the carriage. In one embodiment, there are two stacks of ceramics, 14 and 15, and each is supplied with the error signal produced by one of deviation-measuring cells 7 and 8, after amplification in the units 16 and 17.

Thus, the parasitic movements of the carriage, tending to rotate in the plane XZ about the axis Y, are automatically corrected by the variations in the ceramics 14 and 15, which maintain the stage 13 in a plane XY which is at all times parallel to the direction of the beam F.

In order to still further improve the positioning quality of the stage 13 and to keep it parallel to the beam F whatever the direction of the parasitic movements of the element 6, and in particular, despite parasitic movements tending to rotate the carriage in the plane YZ about the axis X, it is merely necessary to supplement the yaw-correcting device in accordance with the invention by a third deviation-measuring photoelectric detector 18 located on the stage 13 in order to receive a part 21 of the beam F which is transmitted to the same by a partially reflective plate 19 and a mirror 20. Said detector will comprise for example two sectors aligned perpendicularly to the plane of the stage 13, the separation between which, not shown, is parallel to said plane, and will produce an error signal in the event of any parasitic movements of the carriage which tend to rotate the stage 13 in the plane YZ about the axis X. In order to correct these parasitic movements and to maintain the stage 13 parallel to the beam F, said signal, after appropriate amplification is applied to a third stack of ceramics 22, not aligned with the two others 14 and 15 ; in FIG. 2, the cell 18 and the stack 22 are illustrated in broken line, this indicating that they are not in the plane defined by the beams F, 11 and 12, or in the plane of the ceramics 14 and 15. The broken lines of FIG. 2 symbolically illustrate the supports by which the elements 9, 10, 3, 4, 5, 18 are attached to the stage 13.

A supplementary improvement, illustrated schematically in FIGS. 1 and 2, can still further improve the quality of the results obtained by the systems described just now, by correcting possible slow variations in the orientation of the beam F which does duty as the direction reference.

The cell 23 which is a photoelectric transducer fixed to the frame, just like the laser source L, situates on the trajectory of the beam F at the end of the measuring system and advantageously comprising four different sensitive sectors detects any deviations of said beam from its reference position and produces an error signal which applied through 24 to a device 25 which corrects the alignment of the beam ; such a device is a light deflection system which may be, by way of example, that described in the "IEEE JOURNAL OF QUANTUM ELECTRONICS," Apr. 1965, pp. 60, 61, under the title "An Ultrasonic Light Deflection System" by A. KORPEL et al.

It is possible, furthermore, by replacing the two-sector deviation-measuring cells 7,8 and 18 attached to the stage 13, by four-sector cells, and by supplementing the links between the drive element 6 and said stage 13, with piezoelectric ceramics 114 and 115 whose line of action is in the plane XY of FIG. 4 so that the lateral deviations of the carriage 6 in relation to the reference beam F, are compensated in the same way as the vertical diviation.

As already mentioned, systems of this kind can be used to effect high-precision positioning. They can be applied very readily to systems which effect positioning by means of mutually perpendicular translatory motions in the X and Y directions, for which directions they have been stabilized in the manner proposed in accordance with the invention. An assembly of this kind might, as FIG. 3 schematically indicates for example, comprises a carriage 6X movable on the frame 1 in the X direction and itself supporting a carriage 6Y movable in the Y direction. The measurement beam F illuminates two interferometers systems of the kind shown in FIG. 1 and provides a reference direction for the yaw-correcting devices so that in the manner proposed in accordance with the invention horizontal stabilizing of the two stages 13X and 13Y respectively attached to the carriage 6X and 6Y, can be effected by piezoelectric ceramics supplied with a fraction of the beam F through the medium of partially reflective elements 9X and 10X, 9Y and 10Y.

It should be noted that the displacements along the two axes can be simultaneous and that an assembly of this kind can be utilized for producing substantial displacements of up to several meters.

It can be applied in particular to XY-coordinate tables of mask machines for sub-miniature circuit manufacture, having a travel equal to or in excess of 20 cm ; it can likewise be extended to displacements in three mutually perpendicular directions and be used to measure displacement in the three coordinate directions XY and Z, of high-performance plotter devices.

The foregoing description has been given purely by way of a non-limitative example and other variant embodiments are equally possible and fall within the scope of the invention.

What I claim, is:

1. Electro-optical system for controlling the attitude of a stage mounted on a carriage sliding along a parallel bench having a translation axis, comprising : means for emitting at least one beam of radiant energy parallel to said axis, means integral with said stage for detecting said energy and means for displacing said stage with respect to said carriage; said energy detection means including two semi-reflecting faces providing along two optical paths perpendicular to said beam and located within a plane containing said axis, first and second reflected portions of the energy of said beam ; said energy detection means further including at the ends of said paths first and second photoelectric detectors delivering error signals upon reception of said reflected energy portions; said displacing means including at least two electro-mechanical transducers capable of displacing said stage in a direction parallel to said plane and means for feeding back said error signals to said electro-mechanical transducers.

2. Electro-optical system as claimed in claim 1, wherein each of said photoelectric detectors comprises at least two adjacent sectors having a boundary line perpendicular to said plane.

3. Electro-optical system as claimed in claim 1, wherein said emission means comprise : a source of radiant energy and beam splitting means for supplying said one beam and a further beam parallel to said beam ; said energy detection means further comprising a third photoelectric detector integral with said stage and positioned for intercepting said further beam ; said displacing means further comprising a third electro-mechanical transducer controlled by said third photoelectric detector for rotating said stage about an axis parallel to said translation axis.

4. Electro-optical system as claimed in claim 1, wherein said emission means comprise : a source of radiant energy located at one end of said bench and means for controlling the direction of said beam.

5. Electro-optical system as claimed in claim 1, wherein said direction controlling means include deviator means having a control input for deviating said beam at said one end and a photoelectric transducer positioned at the other end of said bench for receiving said deviated beam.

6. Electro-optical system as claimed in claim 1, wherein said means for emitting a beam of radiant energy comprise a laser source.

7. Electro-optical system as claimed in claim 1, wherein each of said electro-mechanical transducers comprises a stack of piezoelectrical ceramics.

8. Electro-optical system as claimed in claim 1, wherein the upper portion of said first carriage is a second bench supporting a second carriage ; said second carriage sliding along a translation axis of said second bench ; said translations axis of said second bench being at an angle with the translation axis of said parallel bench ; a semireflecting face integral with said stage receiving said beam and reflecting along a direction parallel to the translation axis of said second bench a second beam of radiant energy ; said second carriage carrying a second stage ; said energy detection means being positioned on each of said stages and said displacing means being provided between each of said stages and the corresponding carriage.

* * * * *